Figure 1:
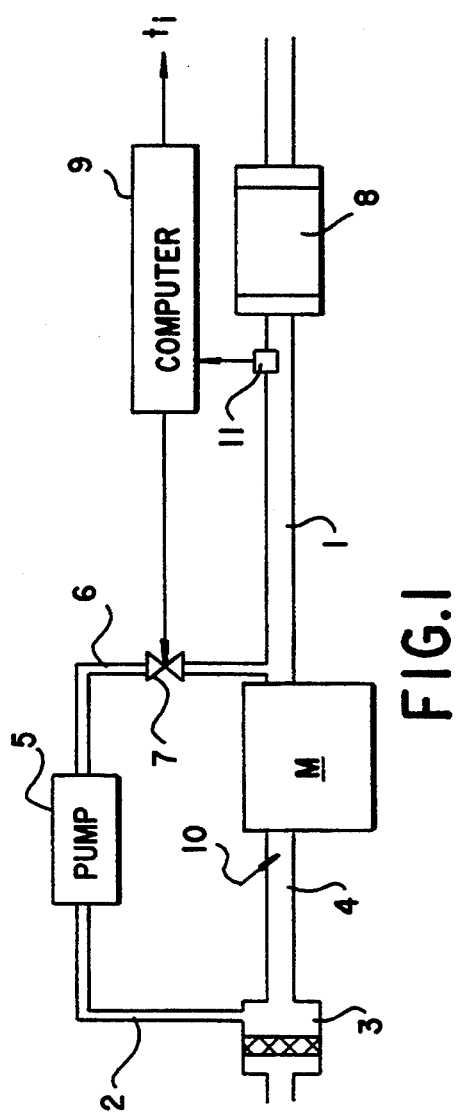

United States Patent [19]

Atanasyan

[11] Patent Number: 5,448,885
[45] Date of Patent: Sep. 12, 1995

[54] TEST METHOD FOR A DEVICE FOR INJECTION OF AIR INTO THE EXHAUST GASES OF AN INTERNAL COMBUSTION ENGINE

[75] Inventor: Alain A. Atanasyan, Tournefeuille, France

[73] Assignee: Siemens Automotive S.A., Toulouse Cedex, France

[21] Appl. No.: 150,184

[22] PCT Filed: May 6, 1992

[86] PCT No.: PCT/EP92/00987

§ 371 Date: Nov. 29, 1993

§ 102(e) Date: Nov. 29, 1993

[87] PCT Pub. No.: WO92/21863

PCT Pub. Date: Dec. 10, 1992

[30] Foreign Application Priority Data

May 28, 1991 [FR] France .................. 91 06382

[51] Int. Cl.[6] .............................................. F01N 3/20
[52] U.S. Cl. ......................................... 60/274; 60/276; 60/289
[58] Field of Search ............ 60/274, 276, 285, 289, 60/290, 307; 123/703

[56] References Cited

U.S. PATENT DOCUMENTS

| | | | |
|---|---|---|---|
| 4,375,746 | 3/1983 | Hattori | 60/289 |
| 4,385,491 | 5/1983 | Sakurai | 60/276 |
| 4,391,256 | 7/1983 | Sawada | 60/289 |
| 5,113,651 | 5/1992 | Kotzan | 60/289 |

FOREIGN PATENT DOCUMENTS 1-216011 8/1989 Japan .

OTHER PUBLICATIONS

Patent Abstract of Japan No. 63-248908 (Makoto Suzuki) Oct. 17, 1988.
Patent Abstract of Japan No. 63-212750 (Makoto Suzuki) Dec. 23, 1988.
Patent Abstract of Japan No. 63-111256 (Demura Takayuki), Sep. 21, 1988.
Patent Abstract of Japan No. 63-143362 (Matsuoka Hiroki), Oct. 24, 1988.

*Primary Examiner*—Ira S. Lazarus
*Assistant Examiner*—Daniel J. O'Connor
*Attorney, Agent, or Firm*—Herbert L. Lerner; Laurence A. Greenberg

[57] ABSTRACT

The mean oxygen richness ($S_o$) of the exhaust gases is measured during a first engine operating phase during which the device for injection of air is active and the mean oxygen richness ($S_1$) of the air/exhaust gases mixture is measured during a second consecutive phase during which this device is inactive and the operating condition of the device is diagnosed by comparing the difference ($S - S_1$) in the oxygen richnesses measured during these two phases, with an expected value of this difference. Application to an engine equipped with a catalytic chamber for oxidation-reduction of the exhaust gases.

5 Claims, 2 Drawing Sheets

TEST METHOD FOR A DEVICE FOR INJECTION OF AIR INTO THE EXHAUST GASES OF AN INTERNAL COMBUSTION ENGINE

The present invention relates to a test method for a device for injection of air into the exhaust gases of an internal combustion engine and, more particularly, to such a method permitting verification of the good mechanical condition of this device and the precision of regulation of the quantity of air injected, obtained with the aid of this device.

Ever more severe antipollution standards oblige the quantities of harmful gases ejected into the atmosphere by internal combustion engines to be reduced. To this end, vehicles are currently equipped these days with a "catalytic" converter arranged in the outlet line of the exhaust gases of the engine in order to oxidise or to reduce the said harmful gases, uncombusted hydrocarbons, carbon oxides, nitrogen oxides, etc. The correct operation of such a catalytic converter requires, as is well known, the presence of means of regulation of the air/fuel mixture supplying the engine. It is necessary, moreover, that the catalyst contained in the chamber is brought to a certain operating temperature, around 350° C., for example.

On starting the engine from cold, however, the temperature of the latter and of the catalytic converter is substantially equal to ambient temperature and thus very far below the correct operating temperature of the catalytic chamber. Furthermore, during such starting, the air/fuel mixture supplying the engine is traditionally highly enriched in fuel. The result of this is that the exhaust gases of the engine then contain quantities of harmful gases, especially uncombusted hydrocarbons and carbon oxides, considered as excessive by certain antipollution standards.

In order to reduce these quantities of harmful gases which cannot then be processed by the catalyst, it has been thought to inject an oxidising gas, air for example, into the exhaust gases of the engine in order to oxidise the harmful products contained in these gases. In FIG. 1 of the attached drawing is represented a device for injection of air into the outlet line 1 of the exhaust gases of an internal combustion engine M. The device comprises a duct 2 connected to a filter 3 placed at the air intake of the inlet piping 4 of the engine M, an air pump 5 and a duct 6 connecting, through a regulating valve 7, the output from the air pump to the outlet line 1 for the exhaust gases of the engine, upstream from a chamber 8 containing an oxidising catalyst for the harmful gases contained in the exhaust gases.

The air is injected during starting of the engine in order to make up for the temporary inefficiency of the catalytic chamber 8 by bringing about, thanks to the oxygen contained in the air, oxidation of the hydrocarbons and the carbon oxides which is suitable for transforming at least a part of the latter into less harmful types (carbon dioxide, water, etc.). The quantity of air injected has to be regulated precisely. In fact, a lack of injected air would bring about incomplete oxidation reactions while an excess of air would bring about too great a cooling of exhaust gases, preventing any chemical reaction in the latter.

In order to do this, the valve 7 is driven by a computer 9 which is normally associated with the engine for controlling the fuel richness of the air/fuel mixture which supplies the engine, this richness being regulated by adjustment of opening time $t_i$ of at least one fuel injector 10 placed in the inlet piping 4. Conventionally also, an oxygen probe 11 is placed in the outlet line 1 of the exhaust gases in order to deliver a signal representing the oxygen richness of these exhaust gases to the computer 9.

The computer is duly programmed in order to, on the one hand, control, in closed loop, the fuel richness of the air/fuel mixture supplying the engine, with the aid of the signal delivered by the oxygen probe 11 and of an appropriate regulation of the opening time $t_i$ of the injectors 10 and, on the other hand, to control the rate of opening of the valve 7 of the device for injection of air into the exhaust of the engine, in the engine start phase. Conventionally, the control law for the valve 7 is of the form:

$$\text{rate of valve opening} = k.f(N,P) \quad (I)$$

where N and P are respectively the speed of rotation of the engine and the inlet pressure, k being a gain.

The correct operation of the device for injection of air into the exhaust obviously determines adherence to antipollution standards during the engine start phases. Now this operation can be altered by various causes, such as a rupture or an accidental detaching of the ducts 2 and 6, a breakdown of the air pump 5 or of the valve 7 or a drift in the rate of opening of the said valve, especially.

In certain current draft antipollution standards, the mandatory presence is proposed, in the vehicle, of means of systematic test of the operation of the device for injection of air, suitable for detecting a breakdown or a defective operation of this device.

Japanese application JP-A-216011 discloses such a means where a failure of the control valve is detected by comparing the difference of the output of an exhaust gas oxygen sensor at the time of opening and closing the valve to a predetermined threshold. Said means is limited to the diagnostic of a total failure, and cannot give any quantitative information nor lead to an onboard corrective action in case of a drift of the device for injection of air.

The present invention thus has the aim of supplying a test method for a device for injection of air into the exhaust of an internal combustion engine, making it possible to detect the appearance of a possible defect in operation of this device, so that a remedy can be applied.

This aim of the invention is attained, as well as others which will appear on reading the present description, with a test method for a device for injection of air into the exhaust gases of an internal combustion engine, according to which there is a controlled variation in the quantity of air injected into these gases, the concomitant variation in the oxygen richness of the air/exhaust gases mixture is evaluated and the operating condition of the device is diagnosed on the basis of this evaluation. According to a first implementation of this method, the mean oxygen richness of the exhaust gases is measured during a first engine operating phase during which the device for injection of air is inactive and the mean oxygen richness of the air/exhaust gases mixture is measured during a second consecutive phase during which this device is activated and the operating condition of the device is diagnosed by comparing the difference in the oxygen richnesses measured during these two phases with an expected value of this difference. If the composition of the air/engine fuel supply mixture is regulated in closed loop by action on the opening time $t_1$ of at least one fuel injector, the said difference in oxygen richnesses can be measured on the basis of the difference in the values of injection time $t_1$ established by the closed-loop regulation during the said first and second operating phases, respectively. These phases then succeed one another during an operating period of the engine when hot, preferably at a stabilised speed.

According to a second implementation of the method according to the invention, the mean oxygen richness of the exhaust gases is measured during a first engine operating phase during which the device for injection of air is active and the oxygen richness of the air/exhaust gases mixture is measured during a second consecutive phase during which this device is inactive and the operating condition of the device is diagnosed by comparing the difference in the oxygen richnesses measured during these two phases, with an expected value. The first and second operating phases succeed each other during a warm-up period of the engine and of a catalytic converter placed in the outlet line of the exhaust gases. The difference in oxygen richnesses is measured during these two phases on the basis of the signal delivered by a "linear" oxygen probe placed in the outlet line of the exhaust gases of the engine, downstream from the device for injection of air. The flow rate of air injected can then be controlled in closed loop with the aid of the signal delivered by this probe.

Figure 2:
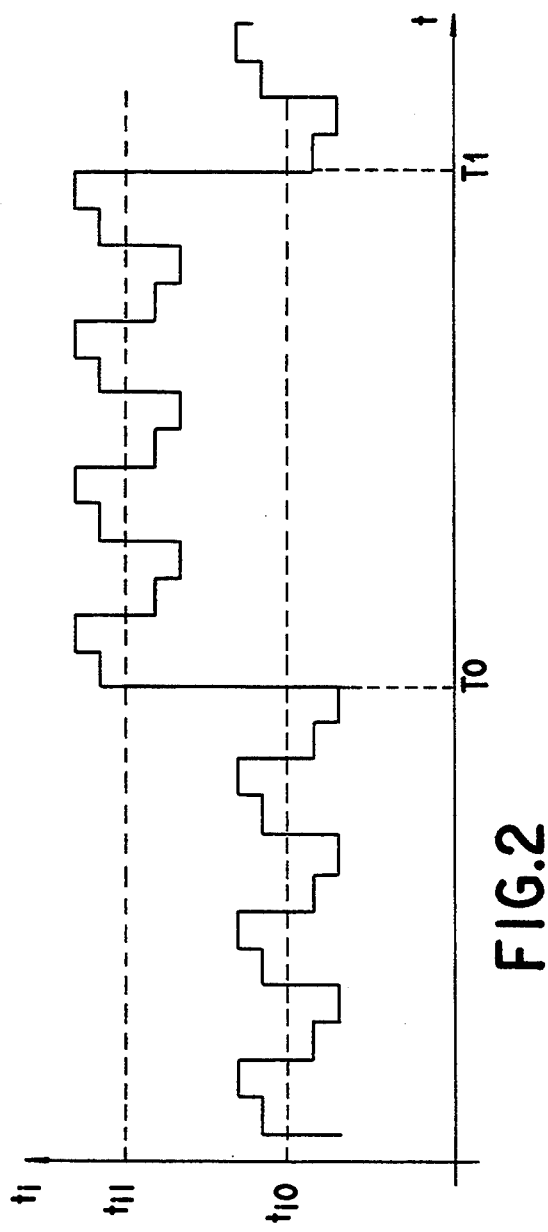
Figure 3:
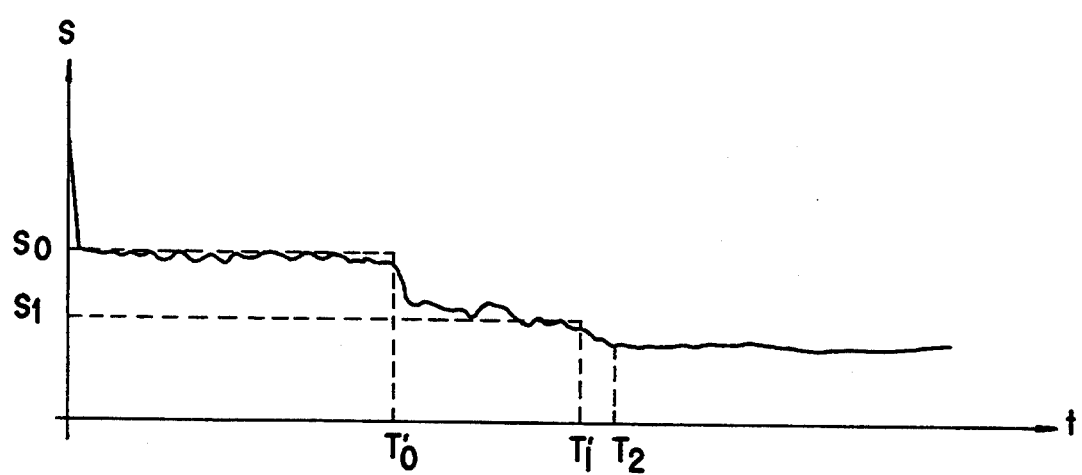

Other characteristics and advantages of the method according to the invention will appear on reading the description which will follow and on examining the attached drawing in which:

FIG. 1 represents diagrammatically an engine equipped with means of closed-loop control of the air/fuel supply mixture of this engine and with a device for injection of air into the exhaust gases of the engine, of a known type, FIG. 2 is a timing diagram of the injection time $t_i$ controlled by the computer, in the context of a first implementation of the method according to the invention, and FIG. 3 is a timing diagram of the signal delivered by a linear oxygen probe, in the context of a second implementation of the method according to the invention.

According to the present invention, the computer 9 is duly programmed in order to test, periodically for example, the operating condition of the device for injection of air into the exhaust gases of the engine. In order to do this, the computer commands a sudden variation in the quantity of air injected into the exhaust gases, and observes the consequences of this variation, either on the value of the injection time $t_i$ which it calculates especially on the basis of the signal supplied by an oxygen probe in order to correct the fuel richness of the mixture which supplies the engine, or on the output signal from a linear oxygen probe as will be explained in detail in the following text.

According to a first implementation of the method according to the invention, illustrated in FIG. 2, the operation of the device for injection of air is tested outside of the periods during which the latter is active, that is to say outside the periods of starting of the engine from cold. In these conditions the mean value $t_{i0}$ of the opening time of the injector is recorded, a value supplied by the computer 9, during a time interval which terminates at the instant $T_0$. The wave form in increments of the timing diagram of FIG. 2 results from the sampling of the signal $t_i$, conditioned by the oscillations in the signal supplied by the oxygen probe 11, of a conventional type, a signal which rocks periodically around a threshold corresponding to a substantially stoichiometric air/fuel mixture.

At $T_0$, activation of the air pump 5 and opening of the valve 7 is commanded, with a given rate of opening. The injection of air (with 20% oxygen) which results from it enriches the exhaust gases in oxygen (normally containing from 1 to 2% only of oxygen). This enrichment is detected by the oxygen probe 11 which transmits the information to the computer 7. The latter then corrects upwards the opening time of the injectors which then takes a mean value $t_{i1}$, up until the computer commands, at instant $T_1$, the cutting-off of the injection of air, after which the opening time falls again to a level close to that which it had before the sudden injection, according to the invention, of air into the exhaust gases.

The difference $(t_{i1} - t_{i0})$ is next compared by the computer to an expected difference $\Delta t_i$ which it calculates especially on the basis of the opening time of the valve which it has demanded.

Three different conclusions can be drawn from the comparison of the difference $(t_{i1} - t_{i0})$ with respect to the expected value $\Delta t_i$ established by the computer.

If $(t_{i1} - t_{i0})$ is substantially equal to $\Delta t_i$, it has to be concluded that the mechanical integrity of the device for injection of air (air pump 5, valve 7, ducts 2 and 6) is intact and that the precision of control of the valve 7 is correct since this device has suitably transmitted to the oxygen probe 11 the perturbation introduced in the composition of the exhaust gases by the injection of air. Any intervention aiming at repairing the device or at correcting the response of the valve 7 to its command by the computer 9 is not to be anticipated.

If $(t_{i1} - t_{i0})$ deviates from $\Delta t_i$ but remains in the region defined by the expression:

$$\Delta t_i \pm x \cdot \Delta t_i \qquad (II)$$

x representing a predetermined precision in percentage terms, it has to be concluded that the mechanical integrity of the device is not affected, that the ducts 2, 6 are correctly connected, that the air pump 5 and the valve 7 are reacting to the command orders. It is the precision of reaction of this valve to these orders which explains the error picked up. The computer 9 can re-establish this precision by suitably correcting the gain k of the control law (I) mentioned above.

Finally if $(t_{i1} - t_{i0})$ passes out of the region defined by the relation (II) above, it has to be concluded that the device for injection of air is suffering from a mechanical breakdown or from a deregulation of the valve 7 which is impossible to correct by adaptation of the gain k of the control law. It is then necessary to anticipate intervention in order to monitor and possibly repair the ducts 2, 6, the pump 5 or the valve 7.

The method described above in connection with the timing diagram of FIG. 2 implies an injection of air (short, it is true) into the exhaust gases while the engine and the catalyst are "hot" and that such an injection thus has no other object than to test the correct operation of the device for injection of air.

This slight drawback is remedied with another implementation of the test method according to the invention, which will now be described in connection with the study of the timing diagram of the output signal from a "linear" or "proportional" oxygen probe, represented in FIG. 3.

Such a probe is known, which is capable of supplying a signal substantially linearly proportional to the oxygen content of the exhaust gases of an internal combustion engine. By way of example of such a probe, the probe sold under the name NTK UEGO by the Japanese Company NGK SPARK PLUG Co. Ltd. can be quoted.

According to the invention, such a probe is used to constitute the probe 11. During a period of cold starting of the engine, and thus when the closed-loop regulation of the air/fuel mixture is temporarily out of service, the operation of the device for injection of air is commanded normally in order to oxidise the harmful gases appearing in the exhaust of the engine. To this effect the computer commands the air pump 5 and the valve 7 with a predetermined rate of opening, according to the control law (I) during a first phase terminating at the instant $T'_0$, slightly earlier than the instant $T_2$ when the injection of air should normally be cut off, the engine and the catalyst having then reached their operating temperature. The mean oxygen richness $S_0$ of the mixture is measured up to the instant $T'_0$ with the aid of the signal S delivered by the linear oxygen probe 9.

During a second phase $(T'_1-T'_0)$ terminating just before the instant $T_2$, the mean oxygen richness $S_1$ is measured of the exhaust gases which have then been suddenly and prematurely deprived of the previously-established injection of air. The mean oxygen richness $S_1$ then measured by the probe is normally reduced with respect to the mean oxygen richness $S_0$ measured during the preceding phase with injection of air. Then $(S_1-S_0)$ is compared to a predetermined expected value $\Delta S$, calculated by the computer, in order to display, as was done above with $(t_{i1}-t_{i0})$ and $\Delta t_i$, the three situations corresponding respectively to correct operation, to operation requiring an adjustment of the control law of the valve and to defective operation requiring intervention on the device for injection of air into the exhaust gases.

It wall be noted that the use of a linear oxygen probe permits closed-loop control of the quantity of air injected into the exhaust gases, during a period of starting up the engine from cold, by virtue of the proportional signal delivered to the computer by the linear oxygen probe used in the second implementation of the test method according to the invention.

Needless to say, the invention is not limited to the two implementations described and represented which have been given only by way of example. Thus, as a variant, a "linear" oxygen probe could be used to produce a direct measurement of the oxygen richness, the engine and the catalyst being "hot", by neutralising the correction of injection time then established by the closed loop. The order of the phases during which the air is injected or not into the exhaust gases could also be reversed. Equally, rather than comparing two situations in which there is and there is not, respectively, injection of air into the exhaust gases, two rates of injection of air of different levels could be commanded successively. More generally, the invention is based on the observation of the reaction of the whole system (engine, regulation, device for injection of air into the exhaust gases) to a controlled perturbation of the air supply.

I claim:

1. A method of testing a device for injecting air into an exhaust gas of an internal combustion engine, which comprises:

injecting air into an exhaust gas of an internal combustion engine;

varying a quantity of injected air in a controlled manner and measuring a resultant variation in a richness of the exhaust gas;

calculating a theoretical variation of the richness as a function of the commanded variation in the quantity of injected air;

comparing the resultant variation in the richness of the exhaust gas with the calculated theoretical variation of the richness; and diagnosing an operating condition of a device for injecting air into the exhaust gas from a result obtained in the comparing step.

2. The method according to claim 1, wherein an air/fuel mixture injected into the internal combustion engine is regulated in a closed loop by controlling an opening time of at least one fuel injector, and wherein the method further comprises:

measuring a mean value of a first injection time during a first operating phase of the engine in which the device for injecting air is inactive;

measuring a mean value of a second injection time during a second operating phase of the engine in which the device for injecting air is activate;

evaluating the variation in the richness of the exhaust gas from a difference of the mean values of the first and second injection times; and diagnosing the operating condition of the device by comparing the difference of the mean values with an expected value $\Delta t_1$.

3. The method according to claim 2, which comprises performing the measuring steps of the first and second injection time successively during a period of hot engine operation and at a stabilized speed.

4. The method according to claim 1, wherein the air injected into the exhaust gas is regulated with a valve and a linear oxygen probe is disposed in an outlet line for the exhaust gas downstream from a point of injection of the air as seen in an exhaust gas flow direction, and wherein the method further comprises:

defining a warm-up phase of the engine and of a catalytic converter disposed in the exhaust gas outlet line as a first operating phase, and controlling the flow of air injected into the exhaust gas on the basis of a signal issued by the linear oxygen probe;

defining a second operating phase, cutting off the flow of air injected into the exhaust gas in the second operating phase, and measuring the signal issued by the linear oxygen probe in the second operating phase; and comparing the signals issued by the probe during the first and second operating phases and defining a measured variation of the signal, and diagnosing the operating condition of the device from a deviation between the measured variation and a calculated variation.

5. The method according to claim 1, wherein the air injected into the exhaust gas is regulated with a valve and the valve is actuated in accordance with a given control law, wherein the method further comprises:

correcting the control law for actuating the valve as a function of a deviation between the resultant variation and the calculated variation, if the deviation is less than a predetermined deviation; and diagnosing a breakdown of the device for injecting air into the exhaust gas, if the deviation exceeds the predetermined deviation.

* * * * *